United States Patent
Haug et al.

(10) Patent No.: US 12,017,654 B2
(45) Date of Patent: Jun. 25, 2024

(54) METHOD FOR CONTROLLING A BRAKING SYSTEM OF A MOTOR VEHICLE

(71) Applicant: Mercedes-Benz Group AG, Stuttgart (DE)

(72) Inventors: Philip Haug, Stuttgart (DE); Markus Kern, Aichtal (DE); Maik Kreller, Dettenhausen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/254,553

(22) PCT Filed: Nov. 2, 2021

(86) PCT No.: PCT/EP2021/080400
§ 371 (c)(1),
(2) Date: May 25, 2023

(87) PCT Pub. No.: WO2022/111951
PCT Pub. Date: Jun. 2, 2022

(65) Prior Publication Data
US 2024/0010202 A1  Jan. 11, 2024

(30) Foreign Application Priority Data

Nov. 27, 2020  (DE) .................... 10 2020 007 248.8

(51) Int. Cl.
*B60W 30/18* (2012.01)
*B60L 7/26* (2006.01)
(Continued)

(52) U.S. Cl.
CPC ......... *B60W 30/18172* (2013.01); *B60L 7/26* (2013.01); *B60W 10/08* (2013.01);
(Continued)

(58) Field of Classification Search
CPC ........... B60T 8/176–1769; B60L 7/26; B60W 10/184; B60W 30/18127
See application file for complete search history.

(56) References Cited

U.S. PATENT DOCUMENTS

| 8,577,531 B2 * | 11/2013 | Semsey ............... B60T 8/17555 |
| | | 188/72.3 |
| 9,744,862 B2 | 8/2017 | Arbitmann et al. |
| 2018/0154777 A1 | 6/2018 | Hall et al. |

FOREIGN PATENT DOCUMENTS

| DE | 10 2007 022 849 A1 | 11/2008 |
| DE | 10 2012 217 679 A1 | 4/2013 |

(Continued)

OTHER PUBLICATIONS

PCT/EP2021/080400, International Search Report dated Feb. 2, 2022 (Three (3) pages).

(Continued)

*Primary Examiner* — Derek D Knight
(74) *Attorney, Agent, or Firm* — Crowell & Moring LLP

(57) ABSTRACT

A method for controlling a braking system of a motor vehicle that includes a plurality of wheels, at least one electric motor as a drive, a service brake and a vehicle dynamic control system. The wheels can be braked by a deceleration torque applied by the service brake and at least partially by a deceleration torque ($M_E$) applied by the electric motor where slippage which arises as a result of braking and/or of intervention by the vehicle dynamic control system is regulated at least primarily through adjustment of the deceleration torque applied by the electric motor. When necessary, a drive torque is applied to regulate slippage or to cause a locked wheel to rotate by the electric motor.

5 Claims, 1 Drawing Sheet

(51) Int. Cl.
  *B60W 10/08*   (2006.01)
  *B60W 10/184*  (2012.01)
  *B60W 10/196*  (2012.01)
  *B60W 30/02*   (2012.01)

(52) U.S. Cl.
  CPC ........ *B60W 10/184* (2013.01); *B60W 10/196* (2013.01); *B60W 30/02* (2013.01); *B60W 30/18127* (2013.01); *B60W 2520/26* (2013.01); *B60W 2520/28* (2013.01); *B60W 2520/30* (2013.01); *B60W 2710/083* (2013.01); *B60W 2710/18* (2013.01)

(56) References Cited

FOREIGN PATENT DOCUMENTS

| | | |
|---|---|---|
| DE | 10 2012 210 328 A1 | 12/2013 |
| DE | 10 2013 214 806 A1 | 9/2014 |
| DE | 102017204000 A1 * | 9/2018 |
| DE | 10 2019 003 910 A1 | 12/2019 |
| DE | 10 2019 004 390 A1 | 12/2020 |
| WO | WO 2011/015422 A1 | 2/2011 |

OTHER PUBLICATIONS

German Search Report issued in German application No. 10 2020 007 248.8 dated Sep. 1, 2021, with Statement of Relevancy (Eight (8) pages).

* cited by examiner

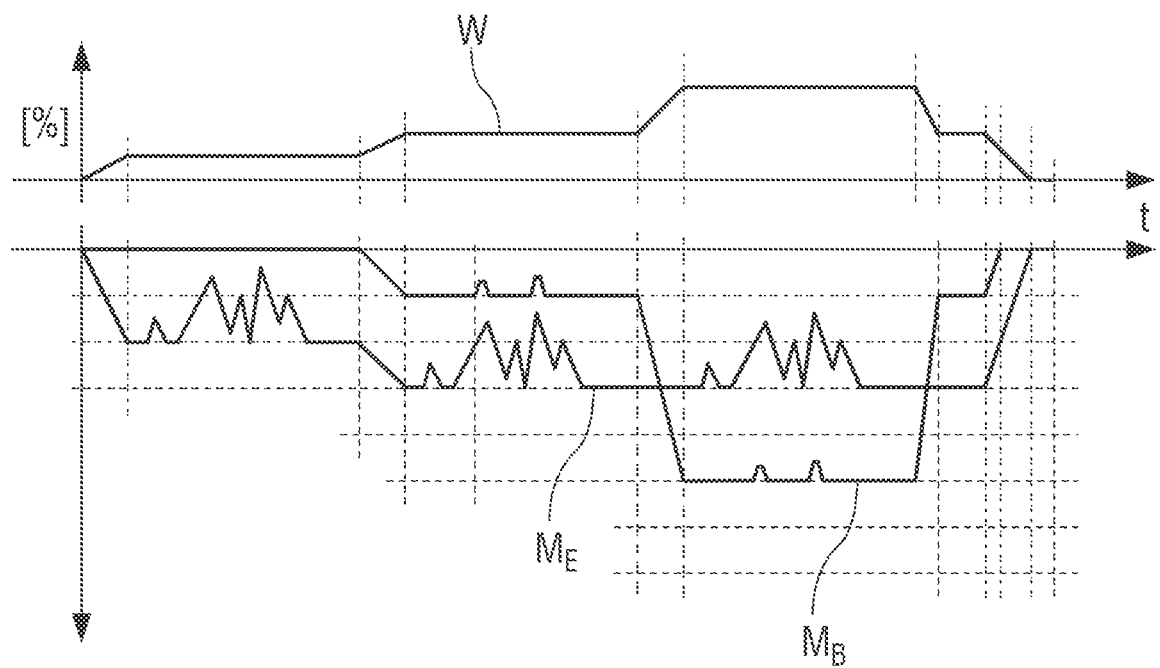

METHOD FOR CONTROLLING A BRAKING SYSTEM OF A MOTOR VEHICLE

BACKGROUND AND SUMMARY OF THE INVENTION

The invention relates to a method for controlling a braking system of a motor vehicle.

It is known to implement a desired deceleration of a motor vehicle by means of vehicle dynamic brake control intervention (ESP/ABS) in the wheel slippage range. A mechanical brake control system (BRS) is used to do this. The braking torque is generated through braking pressure on the brake pad and friction produced on the brake disc.

In the process of deceleration, optimal wheel slippage is detected and adjusted by the braking pressure being adjusted and friction torque being generated on the brake discs. A wheel on which too much brake pressure has been applied is driven again through the existing vehicle speed.

In driving mode, the ESP assesses the wheel speeds and calculates a vehicle reference speed over the ground. Owing to existing network architectures, there are different signal propagation times between the control units concerned (ESP, CPC—central control of the drive train, INV—inverters in electric motors) in the control loop. When vehicle deceleration is required, the vehicle dynamic ABS control intervention is carried out by the ESP control unit. If a braked wheel reduces its speed to the relative vehicle speed, this results in an increased onset of slippage so that the transmission of power to the axle continually decreases until it locks. The ESP unilaterally reduces the braking torque both through reduction of the braking pressure in the braking control loop and restriction of recuperation (permissible slight drag torque (MSR—motor drag torque regulation)). The maximum distributable recuperation torque of the electric motor (INV) is limited by the minimum distributable wheel torque ("torque balance"). As a result, the locked and now unbraked wheel is push-started again in order once again to be braked in the optimal power ratio and further operated in slippage. The mechanical braking torque is gradually realized through different braking pressure gradients. The unlocked but still braked wheel on the other side is necessarily connected via the transmission/differential and motor. In order to allow the adjusted deceleration and driving stability, the braking circuits are adjusted to one another and regulated via the mechanical braking torque. Electric motors only provide a very low motor drag torque via the motor drag regulation (MSR).

The subsequently published DE 10 2019 004 390 discloses a method for controlling a braking system of a motor vehicle with at least two axles, which comprises an electronic braking system and an anti-lock system. Here, the wheels can be braked on the front axle via a service brake of the electronic braking system and the wheels on the rear axle are braked via a service brake of the electronic braking system and/or an electrical recuperation brake. Provision is made for an additional braking torque to be built up by the service brake on the front axle when an upper threshold of the braking torque of the electrical recuperation brake on the rear axle is exceeded. The upper threshold of the braking torque of the electrical recuperation brake on the rear axle can be determined by a maximum slippage torque of the motor vehicle in the current driving situation shortly before the intervention of the anti-lock system or by a maximum representable braking torque of the electrical recuperation brake or by the difference between the braking torques on the rear axle and the front axle. Provision can also be made in the method for a further additional braking torque to be built up by the service brake on the rear axle and possibly also for the braking torque of the electrical recuperation brake to be reduced accordingly here.

The invention sets out to provide an improved method for controlling a braking system of a motor vehicle.

Electric motors are to be understood in the present patent application to be both single-wheel electric drives and electric drives that are connected to one another via a differential. In single-wheel electric drives, the mutual dependencies are dispensed with so the dynamics and distributable power transmission increase.

The term onset of slippage is to be understood to mean that a wheel speed of a wheel concerned differs from the vehicle speed so that a slippage occurs.

In a method according to the invention for controlling a braking system of a motor vehicle, comprising a plurality of wheels, at least one electric motor as a drive, a service brake and a vehicle dynamic control system, wherein the wheels can be braked by means of a deceleration torque ($M_B$) applied by the service brake and at least partially by a deceleration torque ($M_E$) applied by the electric motor, slippage which arises as a result of braking and/or of intervention by the vehicle dynamic control system is regulated at least primarily or exclusively through adjustment of the deceleration torque applied by the electric motor, since this has better and shorter control times than the service brake.

The re-engagement of the wheels can be supported hereby and oscillations in the drive train through the slower regulation of the conventional components can be reduced.

In one embodiment, if necessary, a drive torque is applied to regulate slippage or to cause a locked wheel to rotate by means of the electric motor.

In one embodiment, at least one axle of the motor vehicle is driven by the electric motor via a differential, wherein, if there is a desire to decelerate, the electric motor registers and regulates an increased onset of wheel slippage by means of evaluated wheel speeds in relation to a limiting minimum shaft speed which is prescribed by a control unit of the vehicle dynamic control system, wherein the wheel speed and the wheel torque are registered by the electric motor and the wheel torque is regulated such that the braked wheel is operated in a slippage range prescribed by a control unit of the vehicle dynamic control system.

In one embodiment, the detection and regulation of wheel slippage is carried out preventatively through the deceleration torque of the electric motor and the wheel speed such that a locking of the wheel and an increasing of the wheel slippage is detected and the wheel slippage is regulated before the braked wheel comes to a standstill.

In one embodiment, the electric motor indicates to the control unit of the vehicle dynamic control system a drag torque that can be distributed as far as possible via the axle, and, if the deceleration of the vehicle remains the same or the desired deceleration remains the same, the control unit of the vehicle dynamic control system counteracts a reduction of the electrical deceleration torque by increasing the deceleration torque of the service brake.

In one embodiment, the detection of the wheel slippage is carried out through the permissible minimum shaft speed and therefore increased onset of wheel slippage through the electric motor and/or by imparting a mechanical deceleration torque on both sides.

In one embodiment, each wheel of the motor vehicle is driven by means of a respective electric motor, wherein, if there is a desire to decelerate, the electric motor registers and regulates an increased onset of wheel slippage by means of evaluated wheel speeds in relation to a limiting minimum shaft speed which is prescribed by a control unit of the vehicle dynamic control system, wherein the wheel speed is registered by the electric motor and the wheel torque is regulated by the electric motor such that the braked wheel is operated in a slippage range prescribed by a control unit of the vehicle dynamic control system.

In one embodiment, the electric motor indicates to the control unit of the vehicle dynamic control system a drag torque that can be distributed as far as possible, and, if the deceleration of the vehicle remains the same or the desired deceleration remains the same, the control unit of the vehicle dynamic control system counteracts a reduction of the electrical deceleration torque by increasing the deceleration torque of the service brake.

In one embodiment, the detection of the wheel slippage is carried out through the permissible minimum shaft speed and therefore increased onset of wheel slippage through the electric motor and/or by imparting a mechanical deceleration torque to the wheels individually.

According to one aspect of the present invention, a motor vehicle is provided comprising a plurality of wheels, at least one electric motor as a drive, a service brake and a vehicle dynamic control system, wherein the wheels can be braked by means of a deceleration torque applied by the service brake and at least partially by a deceleration torque applied by the electric motor. According to the invention, the motor vehicle is configured to carry out the method described above.

By means of the electric motor, higher control dynamics are possible than in conventional solutions.

Exemplary embodiments of the invention are explained in more detail below by reference to a drawing.

BRIEF DESCRIPTION OF THE DRAWING

The FIGURE is a schematic diagram depicting a desired deceleration and deceleration torques of a service brake and an electric motor.

DETAILED DESCRIPTION OF THE DRAWING

For the regulation of slippage during braking (ABS) and/or upon intervention of a vehicle dynamic control system ESC or ESP in a vehicle that comprises an electric motor as a drive, the present invention proposes primarily using the electric motor since this has better and shorter control times than the hydraulic brake.

The re-engagement of the wheels can be supported hereby and oscillations in the drive train through the slower regulation of the conventional components can be reduced.

According to the present invention, the braking torques of the (hydraulic) service brake (ABS) and/or ESP regulation with the torques of the electric motor are overlaid so that optimized braking power is achieved while avoiding wheel slippage. It is possible here for the electric motor to apply not only a braking torque but also a drive torque to the wheels in order to avoid slippage, sliding or locking of the wheels.

The very rapid regulation/controlling of the electric motor is advantageous here since, even in the event of small changes, a corresponding counter-torque can thereby be set by the electric motor and the right measures to prevent slippage, sliding or locking of the wheels can therefore be taken. This is not possible with the long control times of the service brake and/or with conventional (hydraulic) braking and control systems (ABS, ESP, etc.).

In this way, it is also possible to prevent oscillations in the drive train which could otherwise arise as a result of the delayed control times of the conventional braking and control systems if repeated interventions are made.

In one embodiment, the torques of the electric motor can be distributed directly onto the individual wheels so that such regulation is possible for each wheel specifically. This is possible, in particular, either if each wheel has an electric motor assigned directly to it or at least each axle has a kind of torque vectoring.

However, the principle of the present invention also applies with axle-wise arrangement of the electric motor. In the case of an electric four-wheel drive or an electric motor for each axle, this is also possible on both or all axles and therefore on all wheels.

The FIGURE shows a schematic diagram depicting a desired deceleration W, a deceleration torque $M_B$ of, in particular, a hydraulic service brake of the vehicle, and a deceleration torque $M_E$ of an electric motor over time t.

If an electric motor drives an axle of a vehicle via a differential, the following applies.

In the event of a deceleration of the vehicle or a desired deceleration W, the axle-driven electric motor registers and regulates the increased onset of wheel slippage by means of evaluated wheel speeds in relation to a limiting minimum shaft speed which is prescribed by an ESP control unit.

Through direct registration of the rotational speed and direct torque registration and torque regulation of the electric motor, the braked wheel can be operated independently in the optimal slippage range (in particular without locking) which is prescribed by the ESP control unit. The detection and regulation of wheel slippage is carried out preventatively through the deceleration torque $M_E$ of the electric motor and the wheel speed so that a locking of the wheel and an increasing of the wheel slippage is detected and regulated before the braked wheel comes to a stop. The electric motor indicates to the ESP control unit a drag torque that can be distributed as far as possible via the axle (shaft torque) in order, if the deceleration of the vehicle remains the same (driver braking specification), to counteract the reduction of the electrical deceleration torque $M_E$ by increasing the deceleration torque $M_B$ of the mechanical service brake.

Before the mechanical deceleration torque $M_B$ is imparted to the wheels individually, wheel slippage is detected by means of the electric motor. This may take place both through the permissible minimum shaft speed and therefore increased onset of wheel slippage through the electric motor, and through a mechanical deceleration torque $M_B$ (drag torque overlaid) imparted on both sides.

Generally speaking, wheel slippage can also be detected from the comparison or relationship of an actual wheel speed to a desired wheel speed, wherein the actual wheel speed can be determined here from the shaft speed, in particular a side drive shaft, and the desired wheel speed can be derived from a specification of the ESP control unit which can determine the speed that this wheel is supposed to have from the specifications of an actual speed of the vehicle and yaw rates or steering angles.

The onset of wheel slippage can be regulated more sensitively through the electric motor in order to transmit frictional forces more dynamically to the ground. Compared to conventional ESP regulation, more effective use is made of the deceleration time, the braking distance being shortened by both an electrical deceleration torque $M_E$ and an overlaid mechanical deceleration torque $M_B$ being applied.

The conventional mechanical ABS regulation by the ESP control unit serves as a fall-back level (functional security).

The following applies to a single-wheel drive through a respective electric motor without any differential.

In the event of a deceleration of the vehicle or a desired deceleration W, the single-wheel-driven electric motor registers and regulates the increased onset of wheel slippage by means of evaluated wheel speeds in relation to a limiting minimum wheel speed which is prescribed by the ESP control unit.

Through a direct speed detection of the electric motor, the braked wheel can be operated independently in the optimal slippage range which is prescribed by the ESP control unit. A wheel that is tending towards locking is registered early and the drag torque on an individual wheel can be adjusted dynamically.

The electric motor indicates to the ESP control unit a drag torque that can be distributed as far as possible (actual wheel-braking torque) in order, if the deceleration of the vehicle remains the same (desired deceleration W), to counteract the reduction of the electrical deceleration torque $M_E$ by increasing the deceleration torque $M_B$ of the mechanical service brake.

Before the mechanical deceleration torque $M_B$ is imparted to the wheels individually, wheel slippage is detected. This may take place both through the permissible minimum wheel speed and therefore increased onset of wheel slippage through the electric motor, and by imparting a mechanical deceleration torque $M_B$ (drag torque overlaid) to the wheels individually.

Generally speaking, wheel slippage can be detected from the comparison or relationship of an actual wheel speed to a desired wheel speed, wherein the actual wheel speed can be determined here from the speed of the electric motor and the desired wheel speed can be derived from a specification of the ESP control unit which can determine the speed that this wheel is supposed to have from the specifications of an actual speed of the vehicle and yaw rates or steering angles.

A torque over a vertical axis (yaw torque) of the vehicle is registered by the ESP control unit and regulated in light of vehicle dynamic specifications. This is also to be understood as meaning that a locked wheel can be initiated again through a prescribed torque by means of the electric motor in order to be actively accelerated.

The onset of wheel slippage can be regulated more sensitively through the electric motor in order to transmit frictional forces more dynamically to the ground. Compared to conventional ESP regulation, more effective use is made of the deceleration time, the braking distance being shortened by both an electrical deceleration torque $M_E$ and an overlaid mechanical deceleration torque $M_B$ being applied.

The conventional mechanical ABS regulation by the ESP control unit serves as a fall-back level (functional security).

In order to avoid oscillations in the drive train, if the vehicle is decelerating, the sensitive and dynamic brake control intervention described can be carried out by the at least one electric motor outside the natural frequencies of the drive train (side shafts, electric motor, motor mount, etc.).

Through the electrical portion of the deceleration torque $M_E$ during the deceleration process, electrical friction losses and wear on the brake control system (brake pad, brake disc, brake calliper) can be reduced.

The design of the thermal requirements can be optimized by saving material and therefore weight.

Through the solution according to the invention, a shortening of the braking distance can be achieved through the rapidly controllable deceleration torques $M_E$, that is to say recuperation torques, of the electric motor by the deceleration torque $M_E$ being regulated before the wheels stop (in the case of ABS braking, the locked wheels have to be push-started/accelerated again). According to the invention, the detection of the wheel slippage and the adjustment of the optimal wheel slippage take place during the deceleration process. Dynamic torque adjustments can be made to decelerate and accelerate wheels individually.

A wheel that is tending towards locking can thereby be registered early and the drag torque on an individual wheel can be adjusted dynamically within the prescribed ESP torque limits without the wheel having to come to a standstill.

The electric motor also continually informs the ESP control unit of a drag torque that can currently be distributed to the electric motor (actual wheel-braking torque) and can then be taken into consideration in determining the braking and within the framework of the overall deceleration.

The decelerating braking torque of the motor vehicle or, more accurately, on the individual wheels of the motor vehicle, can also consist of an electrical deceleration torque and, if applicable, a supplementary deceleration torque of the mechanical service brake in order to decelerate the vehicle if the desired deceleration or the deceleration specification exceeds the drag torque by the electric motor that can be distributed as far as possible via the axle or the wheel. As a result, starting from a basic contribution of the deceleration torque of the mechanical service brake well below a slippage torque of the wheel that is to be expected to an overall deceleration torque, dynamic regulation can be carried out by the electric motor more efficiently and sensitively since the remaining electrical deceleration torque at the overall deceleration torque likewise has the advantages of the present invention.

As a result, the invention may also be used if the prescribed deceleration torque exceeds the maximum deceleration torque that may be applied by the electric motor, that is to say the maximum electrical deceleration torque. Only a portion of the prescribed deceleration torque is then applied by the mechanical service brake here, this being far enough from an expected slippage torque of the wheel and also small enough not to reduce the remaining electrical deceleration torque unnecessarily so that efficient recuperation braking and slippage detection is still possible using the present invention. The distribution of the portions of the deceleration torques may depend here on various parameters, such as, for example, an overall deceleration torque and/or a driving mode of the motor vehicle and/or a prescribed deceleration torque and/or a maximum electrical deceleration torque and/or a charge status of the battery and/or a temperature of the battery and/or environmental conditions and/or a slippage torque of the wheel.

In order to reduce drive train oscillations, a dynamic torque adjustment is possible outside the inherent natural frequencies.

Through the solution according to the invention, a reduction/avoidance of the conventional ESP/ABS control intervention can be achieved. Moreover, energetic friction losses and wear on the brake control system (BRS) are reduced and the bulk of the brake components and therefore of the motor vehicle can be reduced.

List of Reference Characters:
t time
W desired deceleration
$M_B$ deceleration torque
$M_E$ deceleration torque

The invention claimed is:

1. A method for controlling a braking system of a motor vehicle comprising a plurality of wheels, at least one electric motor as a drive, a service brake and a vehicle dynamic control system, comprising:
the plurality of wheels can be braked by a deceleration torque (MB) applied by the service brake and at least partially by a deceleration torque (ME) applied by the electric motor, wherein slippage which arises as a result of braking and/or of intervention by the vehicle dynamic control system is regulated at least primarily through adjustment of the deceleration torque (ME) applied by the electric motor;
wherein, when necessary, a drive torque is applied to regulate slippage or to cause a locked wheel to rotate by the electric motor;
wherein each of the plurality of wheels is driven by a respective electric motor or at least one axle of the motor vehicle is driven by the electric motor via a differential;
wherein when there is a desire to decelerate (W), the electric motor registers and regulates an increased onset of wheel slippage via evaluated wheel speeds in relation to a limiting minimum shaft speed which is prescribed by a control unit of the vehicle dynamic control system, wherein a wheel speed and a wheel torque are registered by the electric motor and the wheel torque is regulated such that a braked wheel is operated in a slippage range prescribed by the control unit of the vehicle dynamic control system;
wherein a detection and regulation of wheel slippage is carried out preventatively through the deceleration torque (ME) of the electric motor and the wheel speed such that a locking of the wheel and an increasing of the wheel slippage is detected and the wheel slippage is regulated before the braked wheel comes to a standstill;
wherein the detection of the wheel slippage is carried out through a permissible minimum shaft speed and therefore increased onset of wheel slippage through the electric motor and/or by imparting a mechanical deceleration torque (MB).

2. The method according to claim 1, wherein the electric motor indicates to the control unit of the vehicle dynamic control system a drag torque that can be distributed as via the axle, and, when the deceleration of the vehicle remains the same or the desired deceleration (W) remains the same, the control unit of the vehicle dynamic control system counteracts a reduction of the electrical deceleration torque (ME) by increasing the deceleration torque (MB) of the service brake.

3. The method according to claim 1, wherein the electric motor indicates to the control unit of the vehicle dynamic control system a drag torque that can be distributed as, and, when the deceleration of the vehicle remains the same or the desired deceleration (W) remains the same, the control unit of the vehicle dynamic control system counteracts a reduction of the electrical deceleration torque (ME) by increasing the deceleration torque (MB) of the service brake.

4. The method according to claim 3, wherein the detection of the wheel slippage is carried out through a permissible minimum shaft speed and therefore increased onset of wheel slippage through the electric motor and/or by imparting a mechanical deceleration torque (MB) to the wheels individually.

5. A motor vehicle, comprising:
a plurality of wheels;
at least one electric motor as a drive;
a service brake; and
a vehicle dynamic control system, wherein the plurality of wheels can be braked by a deceleration torque (MB) applied by the service brake and at least partially by a deceleration torque (ME) applied by the electric motor;
wherein the motor vehicle is configured to perform the method according to claim 1.

* * * * *